US006580428B1

(12) United States Patent
Ryan et al.

(10) Patent No.: US 6,580,428 B1
(45) Date of Patent: Jun. 17, 2003

(54) METHOD AND SYSTEM FOR IDENTIFYING PERIPHERAL ELEMENTS OF A COMPLEX MODEL

(75) Inventors: Kevin M. Ryan, Lowell, MA (US); Serge Elnitsky, Waltham, MA (US)

(73) Assignee: Parametric Technology Corporation, Needham, MA (US)

( * ) Notice: Subject to any disclaimer, the term of this patent is extended or adjusted under 35 U.S.C. 154(b) by 0 days.

(21) Appl. No.: 09/317,541

(22) Filed: May 24, 1999

(51) Int. Cl.[7] ............................................... G06T 17/20
(52) U.S. Cl. ....................................... 345/423; 345/420
(58) Field of Search ................................. 345/419, 420, 345/423, 427, 441, 581

(56) References Cited

U.S. PATENT DOCUMENTS 4,685,070 A * 8/1987 Flinchbaugh ............... 364/522
4,888,583 A * 12/1989 Ligocki et al. ............. 340/729
5,819,016 A * 10/1998 Watanabe et al. ........... 395/119
5,988,862 A * 11/1999 Kacyra et al. .............. 364/578
6,275,225 B1 * 8/2001 Rangarajan et al. ........ 345/333

FOREIGN PATENT DOCUMENTS

| EP | 241071 | 1/1992 |
| EP | 397904 | 7/1994 |
| EP | 204225 | 12/1994 |
| WO | WO 97/22952 | 6/1997 |

* cited by examiner

Primary Examiner—Mano Padmanabhan
(74) Attorney, Agent, or Firm—Lahive & Cockfield

(57) ABSTRACT

The present invention relates to a method and system for determining peripheral elements, e.g., outer surfaces, of a geometrical representation of an object. The method of the invention can be implemented in any computer platform having a facility for creating a geometrical representation of an object. In particular, the computer-implemented method of the invention can be incorporated into a CAD/CAM system as one of the utilities provided by the system.

11 Claims, 8 Drawing Sheets

METHOD AND SYSTEM FOR IDENTIFYING PERIPHERAL ELEMENTS OF A COMPLEX MODEL

TECHNICAL FIELD OF THE INVENTION

The present invention relates to providing a computer implemented method for identifying peripheral elements of a geometrical representation of an object. More particularly, the present invention provides a heuristic method for identifying externally visible elements of a geometrical representation of an object.

BACKGROUND

A computer aided design (CAD)/computer aided manufacturing (CAM) system provides a model of a three dimensional object that includes a geometrical representation of the object. CAD/CAM systems also have the ability to rotate these geometrical representations for viewing from different angles.

A designer employing a CAD/CAM system may want to have access to data representing only the outer surfaces of a geometrical representation of an object without having to access data representative of the entire object. In particular, in many design applications, a designer needs to access a geometrical representation of only the outer surfaces of the object to be able to incorporate that object into a structure to be designed. For example, a designer of a motorcycle gas tank may need data corresponding to the surface geometry of the engine, to be able to shape the tank to avoid the engine. Such a designer does not need to know about the interior components of the engine or the detailed structure of the cooling lines to accomplish her task. In an alternative example, a manufacturer intent on protecting proprietary information may want to provide a designer with data corresponding to the outer surfaces of an object without disclosing to the designer the proprietary components and/or structures contained within the object.

A conventional CAD/CAM system, however, does not provide a capability for identifying and extracting peripheral surfaces of a geometrical representation of an object. Thus, a designer employing such a system has to manipulate data corresponding to the entire object, even when she needs only data corresponding to the outer surfaces. The resulting increase in the computational time causes a loss of productivity. In addition, such a conventional system does not allow a user to provide data corresponding to the outer morphology of an object to another party while simultaneously protecting proprietary information regarding components and/or structures within the object.

Thus, it is an object of the present invention to provide a computer implemented method for identifying peripheral elements of a geometrical representation of an object.

It is another object of the present invention to extract peripheral elements of a geometrical representation of an object.

It is yet another object of the present invention to identify peripheral parts and/or sub-assemblies of a complex object formed of a plurality of parts and/or sub-assemblies.

SUMMARY OF THE INVENTION

The present invention solves the above-described limitations of conventional CAD/CAM systems by providing a computer implemented method for identifying peripheral elements of a geometrical representation of an object. The term "peripheral elements", as used herein, refers to outer surfaces of an object and/or outer sub-assemblies of a complex assembly formed from a plurality of sub-assemblies, and/or outer parts of an object having a plurality of parts. The method of the invention typically receives a geometrical representation that is enclosed in a bounding structure. Alternatively, the method of the invention can receive a geometrical representation that is not enclosed within a bounding structure. In such a case, the method of the invention initially encloses the geometrical representation within a bounding structure, which can have a variety of different shapes. The bounding structure is preferably selected to be a rectangular parallelepiped. It should, however, be understood that the method of the invention is not limited to a particular shape of the bounding structure.

The computer-implemented method of the invention includes a step of sub-dividing the bounding structure into a number of cells. A preferred embodiment of the invention selects the cells to be rectangular parallelepipeds. In a next step, the method of the invention identifies a first subset of the cells, wherein each cell in the first subset contains at least a portion of a surface of the geometrical representation of the object. In a subsequent step, the method identifies a second subset of the cells by iteratively removing from consideration peripheral cells of the bounding structure that are not contained within the first subset. The term peripheral cell, as used herein, refers to a cell that either originally includes an exposed face, i.e., a face not shared with a neighboring cell, or attains an exposed face upon removal of a neighboring cell. Finally, the method identifies the outermost cells of the second subset, thereby identifying the outer elements of the geometrical representation. If an outermost cell contains portions of a plurality of different surfaces of the geometrical representation, the method of the invention can optionally employ a ray tracing procedure to determine which among those surfaces are outermost.

One aspect of the method of the present invention relates to an approximate identification and extraction of those surfaces of a computer generated representation of an object that correspond to externally visible surfaces of the object. In particular, the method of the invention can provide a computer generated display of such surfaces without displaying components and/or structures contained within an envelope of the object formed by such external surfaces.

According to yet another aspect of the invention, a computer-readable medium is provided that holds computer-executable instructions for identifying peripheral elements of a geometrical representation through the method of the present invention.

Another aspect of the present invention relates to providing in a computer platform having a facility for generating a geometrical representation of an object, a transmission medium for transmitting computer-executable instructions for performing the method of the invention for identifying the peripheral elements of the geometrical representation.

The method of the present invention can be practiced in any computer platform having a facility for generating a visual graphical representation of an object. Such a facility may include, but is not limited to, a CAD/CAM system. A CAD/CAM system is particularly suited for implementation of the method of the invention. In particular, the method of the present invention can be incorporated into a CAD/CAM system as one of the utilities provided by such a system. One advantage of implementing the method of the invention in a CAD/CAM system is that many designers are familiar with such systems. Further, such systems provide capabilities for various manipulations of a geometrical representation of an object, typically referred to in a CAD/CAM system as a model, such as rotation of the model so that it can be viewed from various angles.

Illustrative embodiments of the present invention will be described below relative to the following drawings.

DETAILED DESCRIPTION OF THE INVENTION

Figure 1:
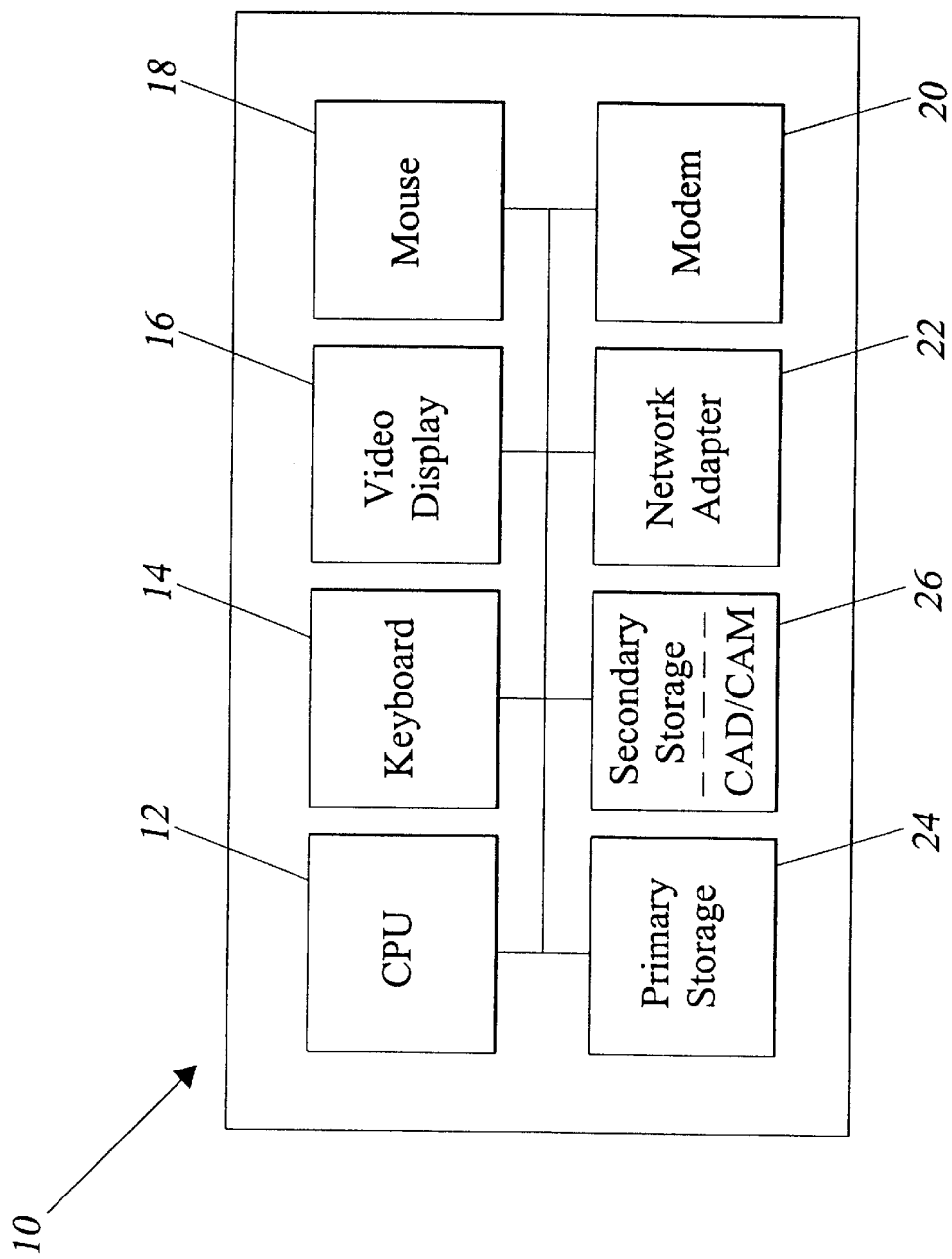
FIG. 1 is a block diagram illustrating components of an exemplary computer system suitable for practicing the illustrative embodiment of the present invention.

In an illustrative embodiment of the present invention, the computer implemented method of the invention is employed to identify and/or extract outer surfaces of a geometrical representation of an object. FIG. 1 is a block diagram that shows the components of an exemplary computer system 10 that can implement the method of the illustrative embodiment. The computer system 10 includes a central processor unit (CPU) 12 for executing instructions. A number of peripheral devices, including a keyboard 14, a video display 16, and a mouse 18, may be provided as part of the computer system 10. A modem 20 may be provided to allow the computer system to communicate over analog telephone lines, and a network adapter 22 may be provided to facilitate the connection of the computer system 10 to a local area network (LAN). The computer system 10 may also include other components, such as a cable modem, for facilitating remote communications with a remote server (not shown).

The computer system 10 includes both primary storage 24 and secondary storage 26. The secondary storage 26 may include a number of different types of persistent storage. For example, the secondary storage 26 may include CD-ROM, floppy disks, hard disks and or any other suitable computer-readable medium, including other devices that use optical, magnetic or other recording material. The primary storage 24 may also include a number of different types of storage, such as DRAM, SRAM, and the like.

The computer system 10 further includes a facility for generating a geometrical representation of an object. For example, a CAD/CAM system, such as the system produced by Parametric Technology Corporation of Waltham, Mass., U.S.A (herein "PTC") under the trade designation Pro/Engineer 2000i, can be stored in the secondary storage 26 to be utilized for producing a model corresponding to surfaces of an object or an assembly of a plurality of objects. The display unit 16 can provide a visual depiction of the surfaces of the model.

The secondary storage device 26 can also store executable instructions for identifying and/or extracting peripheral elements, e.g., outer surfaces of an object and/or peripheral sub-assemblies of a complex assembly, based on the method of the illustrative embodiment. In a preferred embodiment, such executable instructions are incorporated into a CAD/CAM system to provide a designer with the option of identifying and displaying the peripheral elements of a geometrical representation of an object created by the system. Those skilled in the art will appreciate that the computer system shown in FIG. 1 is intended to be merely illustrative and not limiting of the present invention.

Figure 2:
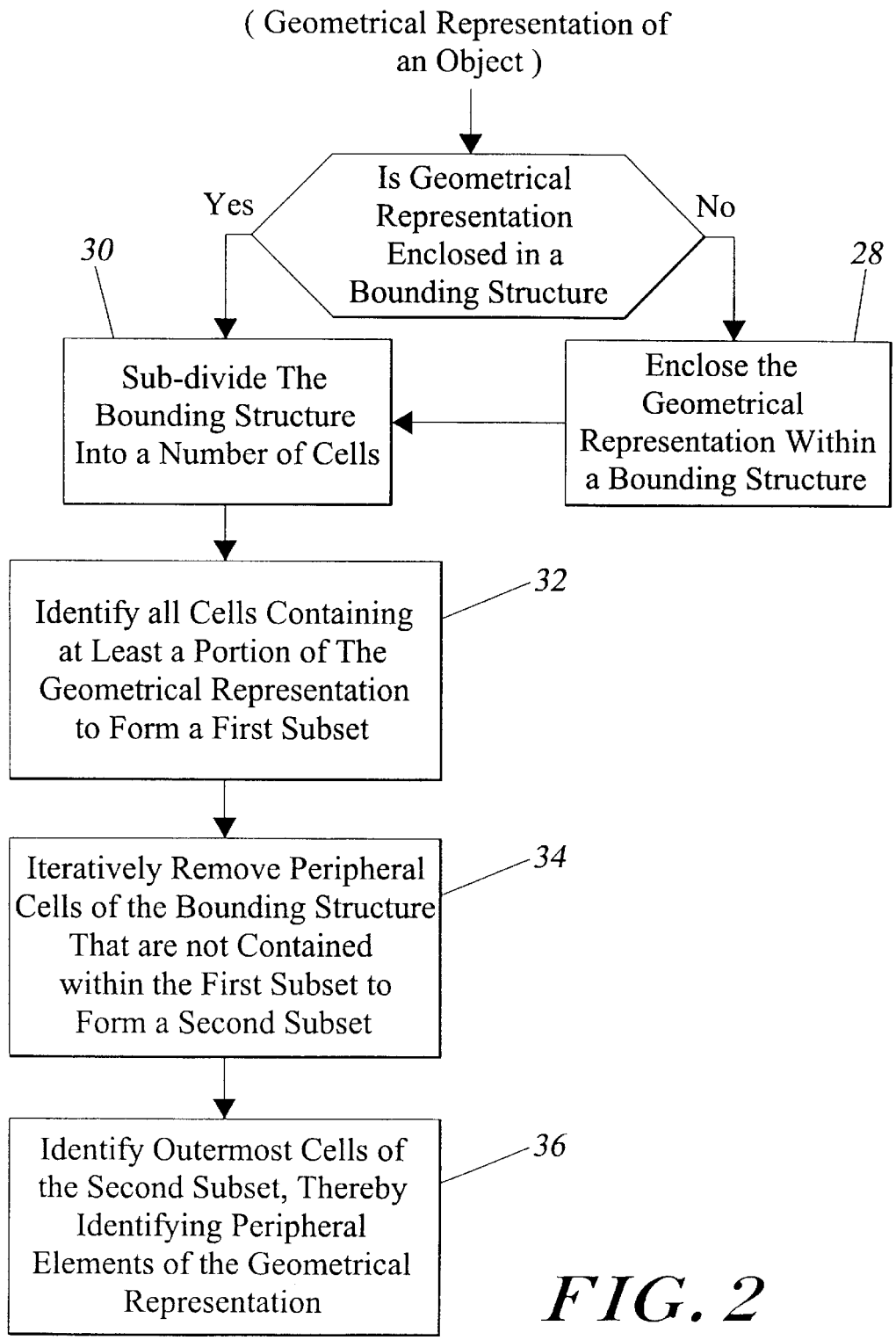
FIG. 2 is a flow chart depicting various steps of a method according to the illustrative embodiment of the present invention for identifying peripheral elements of a computer generated geometrical representation of an object.

FIG. 2 is a flow chart depicting various steps of the illustrative embodiment of the method of the invention, which receives as input a geometrical representation of an object. A CAD/CAM system can, for example, be employed to produce such a geometrical representation. If the geometrical representation is not enclosed in a bounding structure, the illustrative method of the invention in step 28 encloses the geometrical representation in a bounding structure. The bounding structure can preferably be chosen to be a rectangular parallelepiped. The illustrative embodiment in step 30 sub-divides the bounding structure into a number of cells having desired shapes. For example, if the bounding structure is chosen to be a box, the cells are preferably selected to be rectangular parallelepipeds.

In step 32, the illustrative method identifies, for each surface of the object, all cells containing at least a portion of that surface. The cells identified in this manner form a first sub-set of the cells contained within the bounding structure. A preferred embodiment of the invention identifies the cells that contain the surfaces of the geometrical representation in the following manner. Initially, this embodiment tessellates all surfaces of the geometrical representation, i.e., it represents the surfaces by a plurality of triangles. Subsequently, this embodiment examines each triangle to determine within which cell or cells the triangle resides, thereby identifying the cells containing the surfaces of the geometrical representation. Those skilled in the art will understand that methods other than the above tessellation method can be employed to identify the cells that contain the surfaces of the geometrical representation. All such methods are within the scope of the present invention.

In step 34, the illustrative method provides a second sub-set of the cells contained within the bounding structure in a manner described below. A number of cells contained within the bounding structure have at least one exposed face. The term "exposed face" as used herein refers to a face of a cell that is not shared with a neighboring cell. The set of all cells wherein each cell has at least one exposed face is referred to herein as "peripheral cells".

The method in step 34 examines each peripheral cell to determine whether it belongs to the first subset obtained in the step 32, i.e., the method determines whether the examined cell contains at least a portion of one surface of the object. If the examined peripheral cell does not belong to the first subset, the method removes it from consideration. The set of all such peripheral cells that are removed from consideration are herein referred to as cells in a first layer. Subsequently, the method examines the neighboring cells of the cells in the first layer, and removes from consideration those neighboring cells that do not contain any portion of the geometrical representation. The neighboring cells that are removed are herein referred to as cells in a second layer. This procedure is iteratively applied to the subsequent layers, i.e., 3, 4, . . . , n, and terminates at the $n^{th}$ layer where all neighboring cells of the cells in the $n^{th}$ layer contain at least a portion of the geometrical representation or have already been assigned to some layer. The set of all cells that are removed from consideration through the above procedure are herein referred to as boundary cells. The set of all cells minus the boundary cells provide a second subset of the cells contained within the bounding structure. The second subset contains the first subset plus all cells surrounded by the cells in the first subset.

In step 36, the illustrative embodiment identifies outermost cells of the cells contained in the second sub-set described above. The term "outermost cell", as used herein, refers to those cells that form the boundary of a set of cells. An "outermost cell" includes either at least an exposed face, or an exposed edge, or an exposed vertex. An exposed edge, as used herein, refers to an edge of an exposed face, and an exposed vertex, as used herein, refers to a vertex of an exposed face.

Each identified outermost cell of the second subset contains a portion of a peripheral element, for example a peripheral surface, of the geometrical representation of the object. Collectively, the identified outermost cells contain the entire set of the peripheral elements of the object. The outermost cells of the second subset can be manipulated in a number of ways. For example, data contained in such outermost cells can be used for displaying the peripheral elements of the object. Such data while adequate to represent the outer elements, does not include data corresponding to the inner elements, e.g., inner surfaces of the object. Thus, it requires less memory for storage, and can be manipulated more quickly than the data representing the entire object. Such representation of the outer elements of the object is herein referred to as a "lightweight" representation. One important advantage of such a "lightweight" representation is that it can be manipulated more quickly than the data representing the entire object. For example, in a CAD/CAM system, a designer can readily rotate such a "lightweight" representation to view the outer surfaces of an object from different angles.

Figure 3:
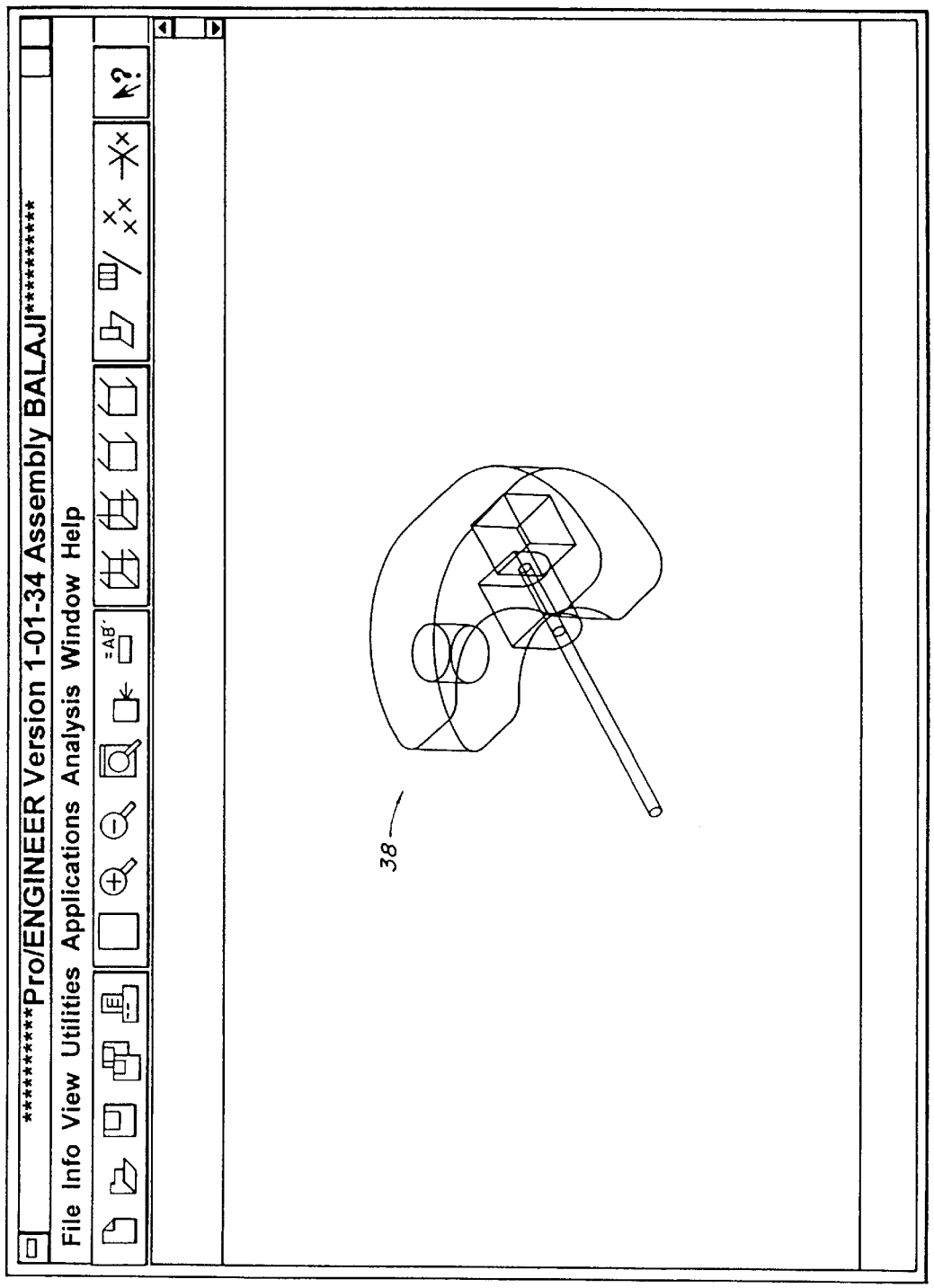
FIG. 3 illustrates a geometrical representation of a complex assembly produced by employing a CAD/CAM system.

FIGS. 3–6 illustrate an exemplary application of the method of the invention, as depicted in the flow chart of FIG. 2, to a geometrical representation of a complex assembly. In particular, FIG. 3 depicts such a geometrical representation 38 of a complex assembly that is created by employing a CAD/CAM program. The illustrated assembly 38 includes internal components and subassemblies enclosed by outer surfaces having irregular shapes.

Figure 4:
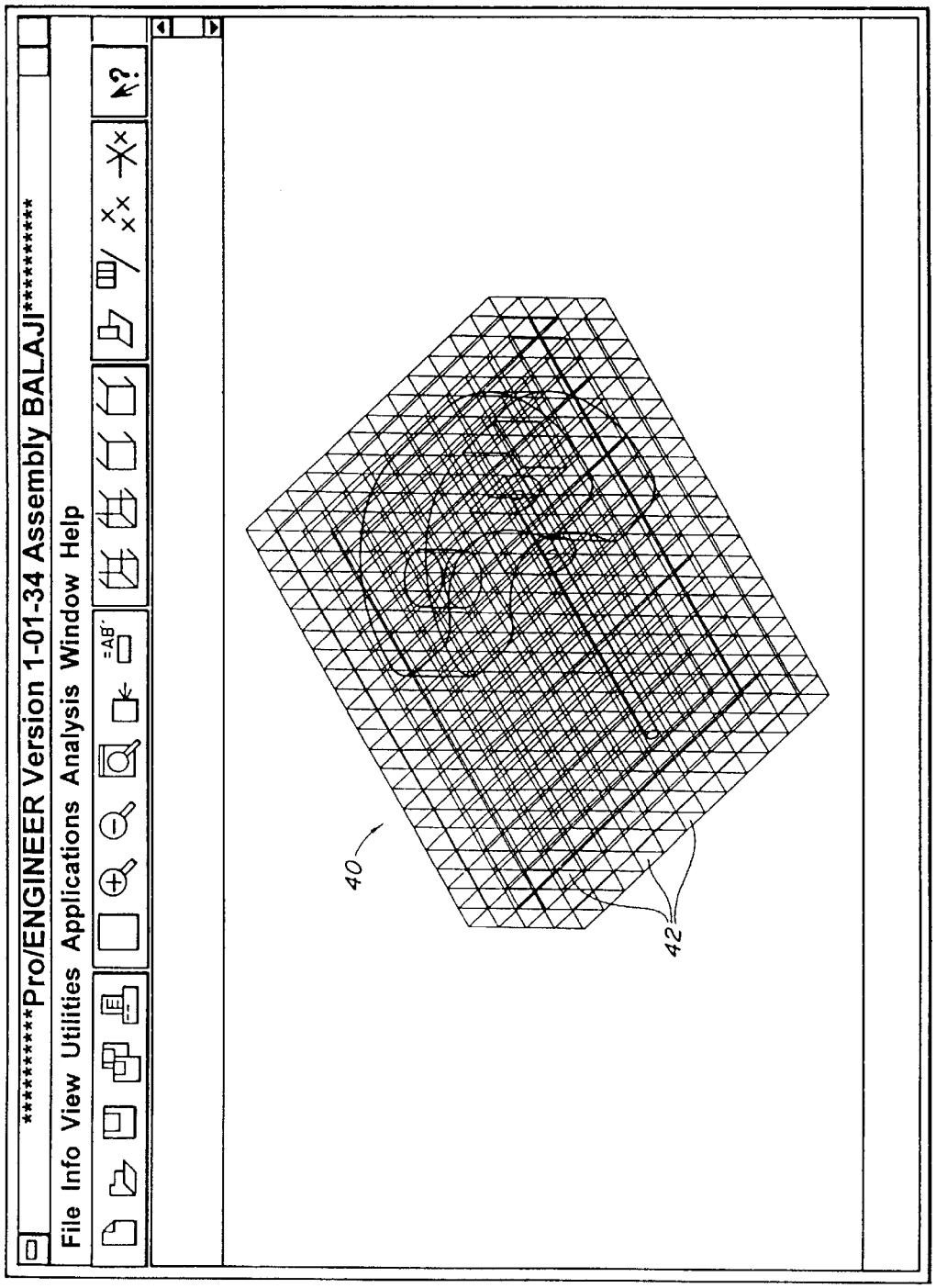
FIG. 4 illustrates the geometrical representation of FIG. 3 enclosed in a bounding box that is sub-divided into a number of cells.
Figure 5:
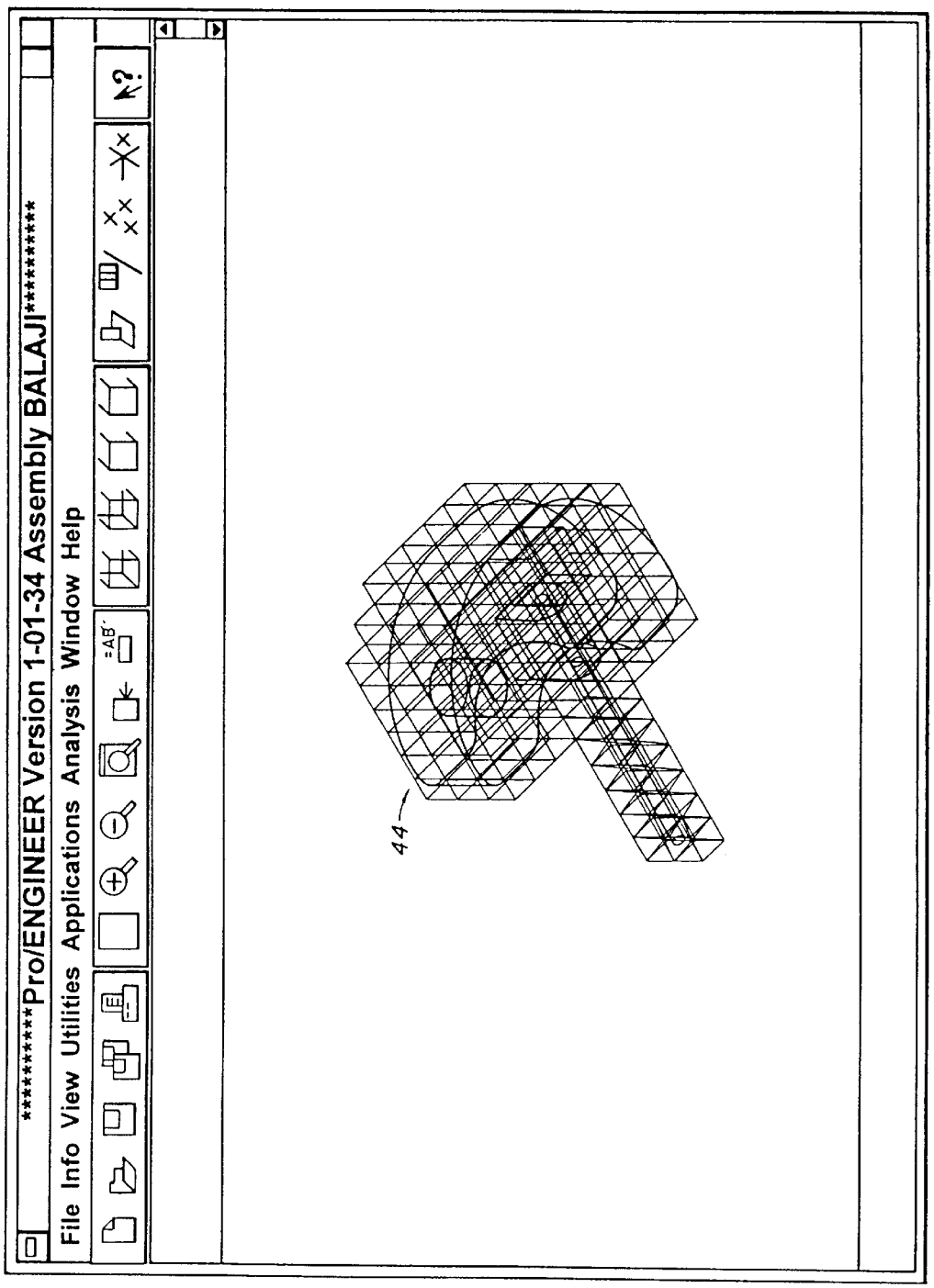
FIG. 5 illustrates the geometrical representation of FIG. 4, wherein the peripheral cells of FIG. 4 which do not include any portion of the geometrical representation are removed.

FIG. 4 shows the entire assembly 38 enclosed within a bounding box 40, where the bounding box 40 is sub-divided into a number of cubical cells 42, according to the procedure of the step 30 of FIG. 2. Application of the steps 32 and 34 of the flow chart of FIG. 2 to the bounding box 40 removes peripheral cells of the bounding box that do not contain any portion of the assembly 38, thereby providing a subset 44 of these cells as shown in FIG. 5. Subsequently, application of the step 36 of the flowchart of FIG. 2 to this subset of the cells, shown in FIG. 5, identifies surfaces and subassemblies forming peripheral elements of the complex assembly 38.

Figure 6:
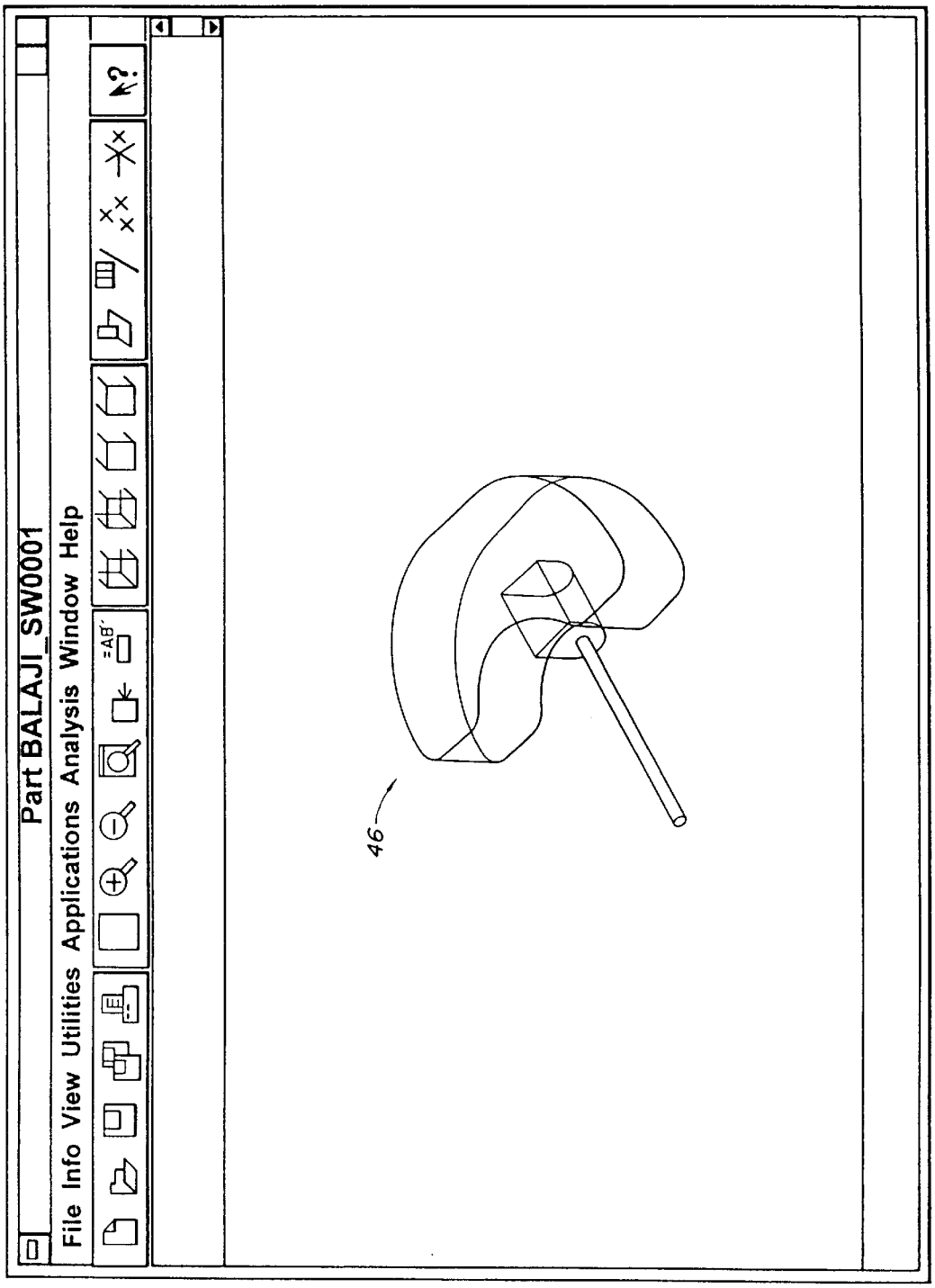
FIG. 6 illustrates the outer surfaces of the complex assembly of FIG. 3, obtained by extracting the surfaces contained in the outermost cells of FIG. 5.

Once the peripheral elements are identified, the computer system 10 with a facility for displaying geometrical representation of three dimensional objects can display these elements. For example, the Pro/Engineer 2000i program may be employed to produce a "lightweight" display 46 (FIG. 6) of the outer surfaces of the assembly 38, identified through application of the method of the present invention to data representing the assembly 38, as described above. While FIG. 6 provides a faithful representation of the outer surfaces of the complex assembly 38, it does not show any of the internal components and/or structures of the assembly 38. Thus, FIG. 6 is a "lightweight" representation of the assembly 38.

The geometrical representation of FIG. 6 can be supplied to a designer who only needs information regarding the geometry of the outer surfaces of the assembly 38, without providing such a designer any information about the inner components and/or structures of the assembly 38. Thus, such a "lightweight" representation of the assembly 38 can protect proprietary information relating to such inner components and/or structures. In addition, it is easier to manipulate such a "lightweight" representation because it contains a fraction of the data needed for a geometric representation of the entire assembly. Accordingly, the display 46 can be easily rotated to be viewed from different angles, and can be readily transferred from one program to another.

A computer program for practicing the present invention can be written in any suitable programming language. Such a programming language can include, but is not limited to, C, C++, and Java™ (Java is a trademark of Sun Microsystems, Inc.). The method of the invention can be implemented by employing standard programming practices.

A preferred implementation of the present invention employs the C programming language. In such an implementation, each cell of the bounding box 40, shown in FIG. 4, can be represented by a data record, e.g., a "struct" in the C programming language. A three-dimensional array of pointers can then be employed to provide the position of each "struct", i.e., the position of each cell, within the bounding box 40. For example, the [0,0,0] element of the array is a pointer that points to a "struct", i.e., a cell, that is located at a peripheral corner of the bounding box. Alternatively, a three-dimensional array of structs can be employed to represent the three-dimensional set of cells of the bounding box 40. Those skilled in the art will understand that data structures for representing the cells are not limited to the above examples.

In such a preferred implementation, the iterative removal of peripheral cells of the bounding box 40 that do not contain a portion of the geometrical representation, i.e., the step 34 of the flowchart of FIG. 2 for removal of the boundary cells, is accomplished in the following way. Each "struct" in this implementation includes a flag variable that is set, in a manner described below, to indicate the position of the cell represented by that "struct" relative to the surfaces of the object. Beginning with all the cells in the bounding box 40, the flag variable of each cell having an exposed face, i.e., each cell on the outer perimeter of the bounding structure, that does not contain any portion of the geometrical representation of the object is set to zero, while the flag variables of all other cells are set to −1. Subsequently, the following operation is repeated for a number of steps: at the $n^{th}$ step, where n=1, 2, 3, . . . , the neighboring cells of those cells whose flag variables are equal to n−1 are examined. If such a neighboring cell (a) contains no portion of the geometrical representation of the object, and (b) has a flag variable that is equal to −1, its flag variable is set to n. The operation terminates when, for some n, no neighbor of any cell whose flag variable equals n−1 satisfies both of the above (a) and (b) conditions. After the termination of the above iterative operation, the cells whose flag variables are equal to −1 form the above-mentioned second subset. The outermost cells of the second subset contain the peripheral elements of the assembly 38 (FIG. 3).

For some geometrical representations, a peripheral cell containing a portion of the geometrical representation may include more than one element, i.e., more than one surface. If such a situation arises, the method of the invention can optionally employ a ray-tracing procedure to determine which among those surfaces is the outermost surface. Under certain situations, the geometry of the surfaces contained within a cell is such that no single surface alone can be considered the outermost surface. For example, two surfaces within an outermost cell can intersect in such a manner that within a first portion of the cell, one surface is closer to an exposed face of the cell, whereas within a second portion of the cell, the other surface is closer to an exposed face of the cell. In such a situation, the ray-tracing method of the invention can retain both surfaces.

Figure 7:
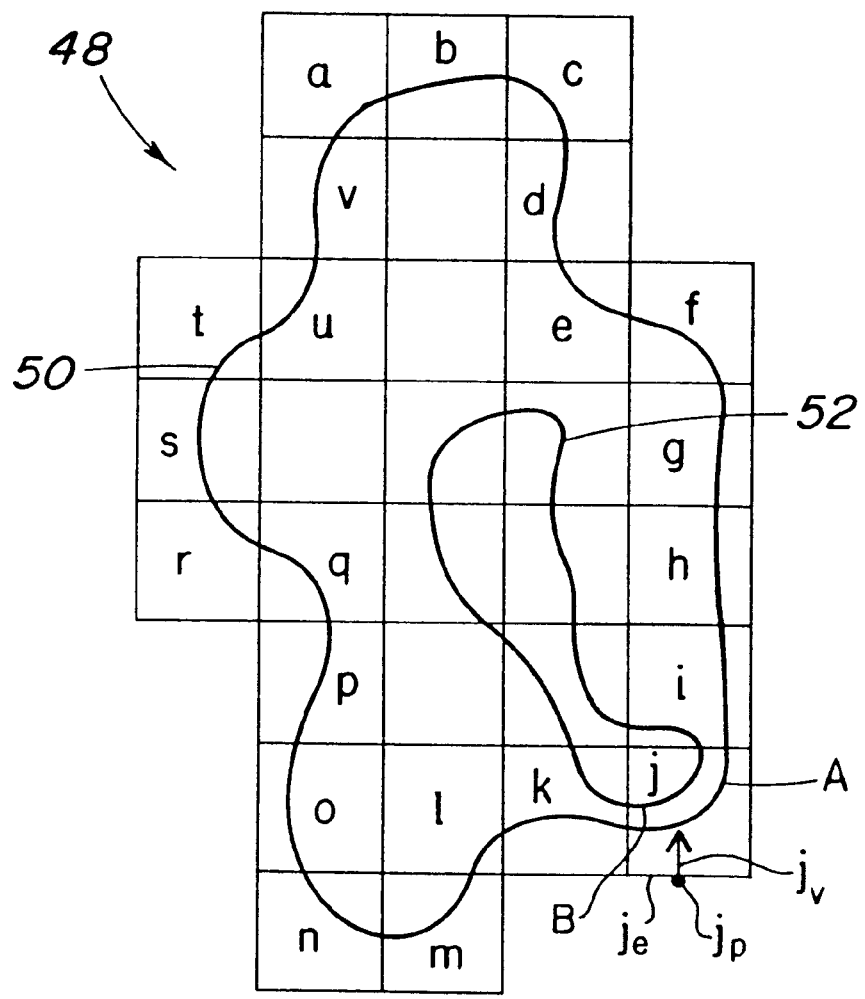
FIG. 7 illustrates a two-dimensional geometrical representation whose outer surface is identified through the method of the present invention.

Without any loss of generality, this aspect of the invention is better explained with reference to a two-dimensional geometrical representation. In particular, FIG. 7 illustrates a two-dimensional representation 48 of an object having a surface 50 and a surface 52. A number of outermost cells, designated by letters a through v and identified through the above-described method of the invention, contain the outer surface 50 of the geometrical representation 48. Three of these cells, namely the cells designated by the letters i, j, and k contain not only a portion of the outer surface 50, but also a portion of the inner surface 52. The method of the invention can optionally employ a ray-tracing procedure, as described below, to determine which portion belongs to the outer surface 50.

For example, the cell j contains a portion A of the outer surface 50 and a portion B of the inner surface 52. An arbitrary point $j_p$ on an exposed face $j_e$ of the cell j is selected. It is then determined that the portion A is first encountered while moving from the point $j_p$ into the interior of the cell j, i.e., moving along a vector $j_v$. Thus the surface 50 is designated as the outer surface.

Figure 8:
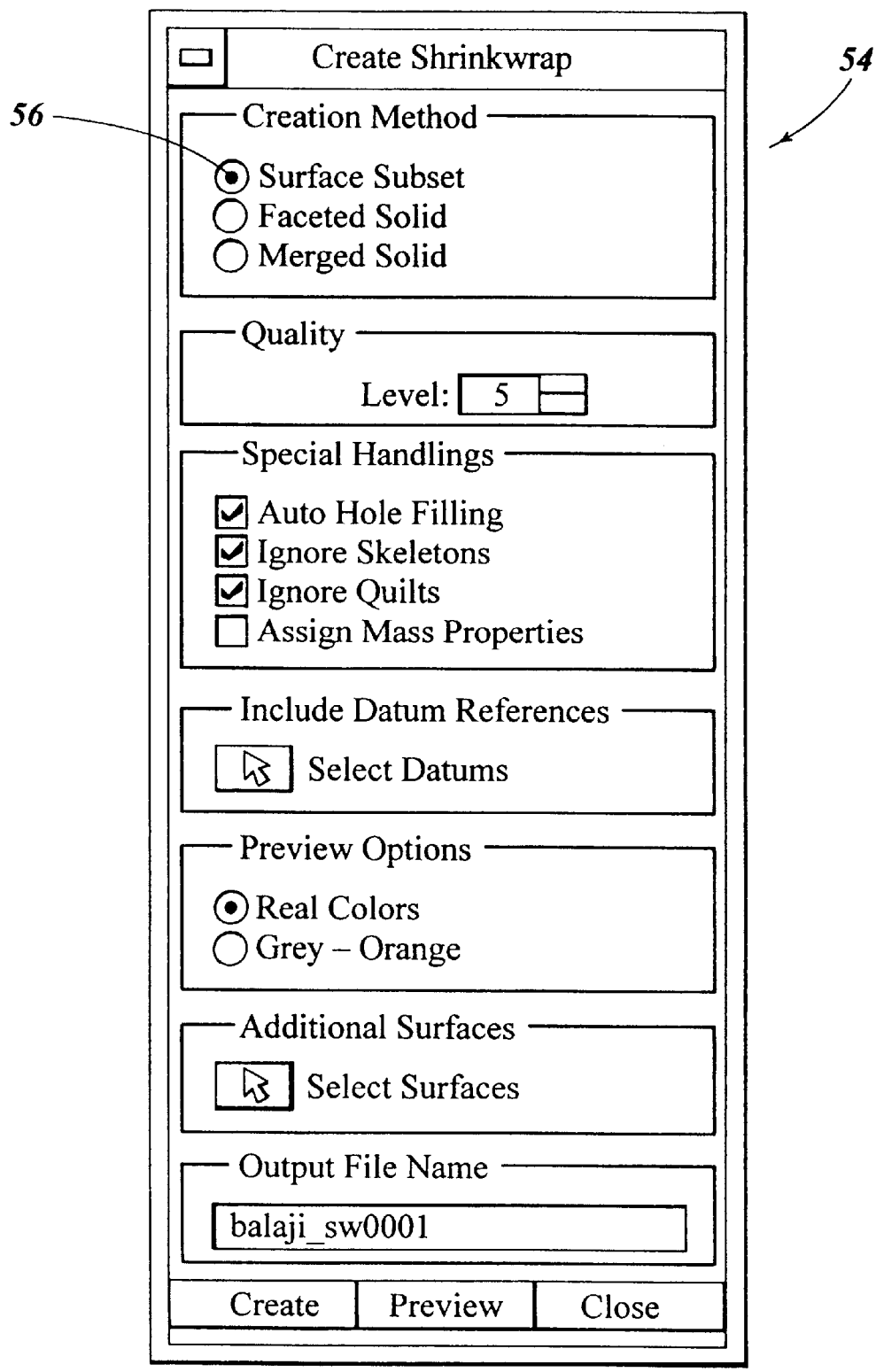
FIG. 8 illustrates an exemplary dialogue box of a CAD/CAM system for obtaining peripheral elements of a geometrical representation through the method of the present invention.

The method of the present invention can be incorporated into a CAD/CAM system as one of the utilities provided by such a system. For example, FIG. 8 illustrates a dialogue box 54 of a CAD/CAM system, such as the PTC Pro/Engineer 2000i system, that includes a menu item 56, i.e., surface subset, for identifying the peripheral elements, i.e., the outer envelope, of a geometrical representation. By employing an inputting device, such as a mouse, the dialogue box 54 can be accessed, and the menu item 56 for obtaining the outer envelope of a geometrical representation, such as the geometrical representation 38 of FIG. 3, be selected. A user employing such a CAD/CAM system can also select a particular quality level, e.g., from level 1 to level 10, for the outer envelope of the geometrical representation. The dialogue box 54 shows an illustrative selection of level 5 for the quality of the outer envelope. The quality level is related to the number of cells chosen for sub-dividing the bounding structure enclosing the geometrical representation. An increase in the numerical value of the quality level results in employing a larger number of cells for sub-dividing the bounding structure.

While the present invention has been described with reference to above illustrative embodiments, those skilled in the art will appreciate the various changes in form and detail may be made without departing from the intended scope of the present invention as defined in the appended claims.

What is claimed is:

1. A computer implemented method for identifying peripheral elements of a geometrical representation of an object, said geometrical representation being enclosed within a bounding structure, and said method comprising the steps of:
    sub-dividing the bounding structure into a number of cells,
    identifying a first subset of said cells, wherein each cell in said first subset contains a portion of the geometrical representation,
    identifying a second subset of said cells by iteratively removing from consideration boundary cells of the bounding structure, and
    identifying outermost cells of said second subset, thereby identifying the peripheral elements of the geometrical representation.

2. The method of claim 1, wherein the bounding structure and the cells are rectangular parallelepipeds.

3. The method of claim 1, further comprising the step of providing a compilation of said identified peripheral elements to produce a geometrical representation of said peripheral elements.

4. The method of claim 1, wherein said object is formed of a number of sub-assemblies, and said peripheral elements are outermost members of the sub-assemblies.

5. The method of claim 1, wherein said object is formed of a number of parts, and said peripheral elements are outermost parts of said number of parts.

6. The method of claim 1, wherein said geometrical representation includes a geometrical representation of the object in a CAD/CAM environment.

7. The computer-implemented method of claim 1, further comprising the step of identifying, for any of said outermost cells containing a plurality of portions of elements of the geometrical representation, one of said portions that belongs to a set of peripheral elements.

8. The computer-implemented method of claim 7, wherein the step of identifying one of said portions includes the steps of:
    selecting at least one point on at least one exposed face of an outermost cell containing said plurality of portions of elements,
    designating a portion first encountered while moving from said selected point inwardly into said outermost cell as belonging to the set of peripheral elements.

9. In a computer platform having a facility for generating a geometrical representation of an object wherein said geometrical representation is enclosed within a bounding structure, a computer readable medium holding computer executable instructions for performing a method for identifying peripheral elements of the geometrical representation, comprising the step of:
    sub-dividing the bounding structure into a number of cells,
    identifying a first subset of said cells, wherein each cell in said first subset contains a portion of the geometrical representation,
    identifying a second subset of said cells by removing from consideration boundary cells of the bounding structure, and
    identifying outermost cells of said second subset, thereby identifying the peripheral elements of the geometrical representation.

10. In a computer platform having a facility for generating a geometrical representation of an object wherein the geometrical representation is enclosed within a bounding structure, a transmission medium for transmitting computer-executable instructions for performing a method, comprising the steps of:
- sub-dividing the bounding structure into a number of cells,
- identifying a first subset of said cells, wherein each cell in said first subset contains a portion of the geometrical representation,
- identifying a second subset of said cells by removing from consideration boundary cells of the bounding structure, and
- identifying outermost cells of said subset, thereby identifying the peripheral elements of the geometrical representation.

11. A computer readable medium holding computer-executable instructions for identifying peripheral elements of a geometrical representation of an object according to a method comprising the steps of:
- enclosing the geometrical representation within a bounding structure,
- sub-dividing the bounding structure into a number of cells,
- identifying a first subset of said cells, wherein each cell in said first subset contains a portion of the geometrical representation,
- identifying a second subset of said cells by removing from consideration boundary cells of the bounding structure, and
- identifying outermost cells of said second subset, thereby identifying the peripheral elements of the geometrical representation.

* * * * *